(12) United States Patent
Luo et al.

(10) Patent No.: US 12,710,579 B2
(45) Date of Patent: Aug. 18, 2026

(54) INKJET GRADIENT INDEX MATERIAL TO MODULATE GRATING DIFFRACTION EFFICIENCY

(71) Applicant: Applied Materials, Inc., Santa Clara, CA (US)

(72) Inventors: Yingdong Luo, Newark, CA (US); Jinxin Fu, Fremont, CA (US); Zhengping Yao, Cupertino, CA (US); Daihua Zhang, Los Altos, CA (US); Ludovic Godet, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 270 days.

(21) Appl. No.: 18/473,079

(22) Filed: Sep. 22, 2023

(65) Prior Publication Data

US 2024/0142690 A1 May 2, 2024

Related U.S. Application Data

(60) Provisional application No. 63/419,768, filed on Oct. 27, 2022.

(51) Int. Cl.
*F21V 8/00* (2006.01)

(52) U.S. Cl.
CPC ........... *G02B 6/0016* (2013.01); *G02B 6/002* (2013.01); *G02B 6/0036* (2013.01); *G02B 6/0046* (2013.01); *G02B 6/0065* (2013.01)

(58) Field of Classification Search
CPC .... G02B 6/0016; G02B 6/002; G02B 6/0036; G02B 6/0046; G02B 6/0065; G02B 27/017
See application file for complete search history.

(56) References Cited

U.S. PATENT DOCUMENTS 6,545,808 B1 * 4/2003 Ehbets ............... G02B 6/02085 359/569
7,526,151 B1 4/2009 Little et al.
(Continued)

FOREIGN PATENT DOCUMENTS

CN 121002408 A * 11/2025 ........... G02B 6/0036
KR 10-2022-0085620 A 6/2022

OTHER PUBLICATIONS

International Search Report and Written Opinion dated Jan. 18, 2024 for Application No. PCT/US2023/033489.

*Primary Examiner* — Rhonda S Peace
(74) *Attorney, Agent, or Firm* — Patterson + Sheridan, LLP

(57) ABSTRACT

An apparatus for waveguides and a method of fabricating a waveguide combiner having at least one grating with trenches gap-filled with variable refractive index materials. At least two trenches of at least one grating includes a first gap-fill material having a first volume and a first refractive index, and a second gap-fill material having a second volume and a second refractive index different than the first refractive index. Control of the deposition of first volume and the deposition of second volume in an inkjet deposition process provide for the formation of the grating with two trenches that have different refractive indices and different gap-fill depths. The first gap-fill material and the second gap-fill material merge to form the gap-filler. Therefore, by controlling the varied refractive indices and different gap-fill depths the waveguide combiner is optimized by efficiency or a color uniformity.

22 Claims, 4 Drawing Sheets

(56) References Cited

U.S. PATENT DOCUMENTS

| | | | | |
|---|---|---|---|---|
| 10,436,968 | B2 | 10/2019 | Menezes et al. | |
| 10,732,351 | B2 * | 8/2020 | Colburn | G02B 27/0172 |
| 10,823,887 | B1 | 11/2020 | Calafiore et al. | |
| 10,895,671 | B1 * | 1/2021 | Calafiore | H01J 37/3171 |
| 11,105,982 | B2 * | 8/2021 | Vora | G02B 27/0172 |
| 11,391,870 | B2 * | 7/2022 | Rahomäki | G02B 27/0172 |
| 11,709,422 | B2 * | 7/2023 | Franke | G03F 7/091<br>430/323 |
| 11,789,186 | B1 * | 10/2023 | Calafiore | G02B 27/0172<br>29/428 |
| 11,867,931 | B2 * | 1/2024 | Luo | G03F 7/16 |
| 12,352,988 | B2 * | 7/2025 | Sell | G02B 5/1819 |
| 12,360,383 | B2 * | 7/2025 | Weinstein | G02B 27/4205 |
| 2005/0057815 | A1 * | 3/2005 | Lai | B29D 11/00355<br>359/652 |
| 2013/0321900 | A1 * | 12/2013 | Vallius | G02F 1/3558<br>359/328 |
| 2017/0307887 | A1 * | 10/2017 | Stenberg | G02B 26/0808 |
| 2021/0199971 | A1 | 7/2021 | Lee et al. | |
| 2021/0255463 | A1 | 8/2021 | Popovich et al. | |
| 2022/0091314 | A1 | 3/2022 | Luo et al. | |
| 2022/0204790 | A1 | 6/2022 | Zhang et al. | |
| 2023/0341684 | A1 * | 10/2023 | Yang | G02B 6/3532 |
| 2023/0384596 | A1 * | 11/2023 | Fu | G02B 6/0038 |
| 2024/0142690 | A1 * | 5/2024 | Luo | G02B 27/0172 |

* cited by examiner

INKJET GRADIENT INDEX MATERIAL TO MODULATE GRATING DIFFRACTION EFFICIENCY

CROSS-REFERENCE TO RELATED APPLICATIONS

This application claims priority to U.S. Provisional Patent Application Ser. No. 63/419,768, filed on Oct. 27, 2022, which is herein incorporated by reference.

BACKGROUND

Field

Embodiments of the present disclosure generally relate to waveguides for augmented, virtual, and mixed reality. More specifically, embodiments described herein provide for waveguides and a method of fabricating a waveguide combiner having at least one grating with trenches gap-filled with variable refractive index materials.

Description of the Related Art

Virtual reality is generally considered to be a computer generated simulated environment in which a user has an apparent physical presence. A virtual reality experience can be generated in 3D and viewed with a head-mounted display (HMD), such as glasses or other wearable display devices that have near-eye display panels as lenses to display a virtual reality environment that replaces an actual environment.

Augmented reality (AR), however, enables an experience in which a user can still see through the display lenses of the glasses or other HMD device to view the surrounding environment, yet also see images of virtual objects that are generated to appear as part of the environment. Augmented reality can include any type of input, such as audio and haptic inputs, as well as virtual images, graphics, and video that enhance or augment the environment that the user experiences. As an emerging technology, there are many challenges and design constraints with augmented reality.

One such challenge is displaying a virtual image overlaid on an ambient environment. Waveguide combiners, such as augmented reality waveguide combiners, are used to assist in overlaying images. Generated light is propagated through a waveguide combiner until the light exits the waveguide combiner and is overlaid on the ambient environment.

Accordingly, what is needed in the art are a method of fabricating a waveguide combiner having at least one grating with trenches gap-filled with variable refractive index materials.

SUMMARY

In an embodiment, a waveguide combiner is provided. The waveguide includes a grating disposed on a substrate, the grating having a plurality of optical device structures defining a plurality of trenches, each trench is defined by adjacent optical device structures, a first gap-fill material having a first refractive index, and a second gap-fill material having a second refractive index less than the first refractive index. The plurality of trenches include a first trench with the first gap-fill material and the second gap-fill material disposed therein, and a second trench with the first gap-fill material and the second gap-fill material disposed therein. Further the waveguide includes that a volume of at least one of the first gap-fill material and the second gap-fill material in the first trench is different from volume of at least one of the first gap-fill material and the second gap-fill material in the second trench, and a total volume of the first dap-fill material and the second gap-fill material in the first trench is different from the total volume of the first gap-fill material and the second gap-fill material in the second trench.

In another embodiment, a waveguide combiner is provided. The waveguide combiner includes a first grating disposed on a first surface of a substrate, the first grating having a plurality of optical device structures defining a plurality of trenches, each trench is defined by adjacent optical device structures. A height of the optical device structures varies along with a depth of the plurality of trenches. The waveguide combiner further includes a first gap-fill material having a first refractive index, and a second gap-fill material having a second refractive index less than the first refractive index. The plurality of trenches include a first trench with the first gap-fill material and the second gap-fill material disposed therein, and a second trench with the first gap-fill material and the second gap-fill material disposed therein. Further, the waveguide combiner includes that a volume of at least one of the first gap-fill material and the second gap-fill material in the first trench is different from volume of at least one of the first gap-fill material and the second gap-fill material in the second trench, and a total volume of the first gap-fill material and the second gap-fill material in the first trench is different from the total volume of the first gap-fill material and the second gap-fill material in the second trench.

In another embodiment, a method of forming a waveguide combiner is provided. The method includes forming a grating on a substrate having a plurality of optical device structures defining a plurality of trenches, each trench is defined by adjacent optical device structures, and inkjeting a first gap-fill material having a first refractive index and a second gap-fill material having a second refractive index less than the first refractive index over the grating in the trenches. The trenches include a first trench with the first gap-fill material and the second gap-fill material disposed therein, and a second trench with the first gap-fill material and the second gap-fill material disposed therein. The trenches further include that a volume of at least one of the first gap-fill material and the second gap-fill material in the first trench is different from volume of at least one of the first gap-fill material and the second gap-fill material in the second trench, and a total volume of the first gap-fill material and the second gap-fill material in the first trench is different from the total volume of the first gap-fill material and the second gap-fill material in the second trench. The method further includes curing the first gap-fill material and the second gap-fill material during a curing process.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 23 is a schematic, cross-sectional view of a grating of a waveguide combiner according to embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure generally relate to waveguides for augmented, virtual, and mixed reality. More specifically embodiments described herein provide for waveguides and a method of fabricating a waveguide combiner having at least one grating with trenches gap-filled with variable refractive index materials. At least one grating may be one of an input coupling grating (ICG), a pupil expansion grating (PEG), or an output coupling grating (OCG). The grating includes trenches gap-filled with two materials of two different refractive indices. At least two trenches of at least one grating includes a first gap-fill material having a first volume and a first refractive index, and a second gap-fill material having a second volume and a second refractive index different than the first refractive index. A volume of at least one of the first gap-fill material and the second gap-fill material in a first trench is different from the volume of at least one of the first gap-fill material and the second gap-fill material in a second trench. This allows for the refractive index (RI) to be different across the trenches. A total volume of material is the total of the volume of the first gap-fill material and the second gap-fill material inside a respective trench in the plurality of trenches. The at least two trenches have different refractive indices and different gap-fill depths to optimize an efficiency or a color uniformity of the waveguide combiner. Control of the deposition of first volume and the deposition of second volume in an inkjet deposition process provide for the formation of the grating with two trenches that have different refractive indices and different gap-fill depths.

Figure 1A:
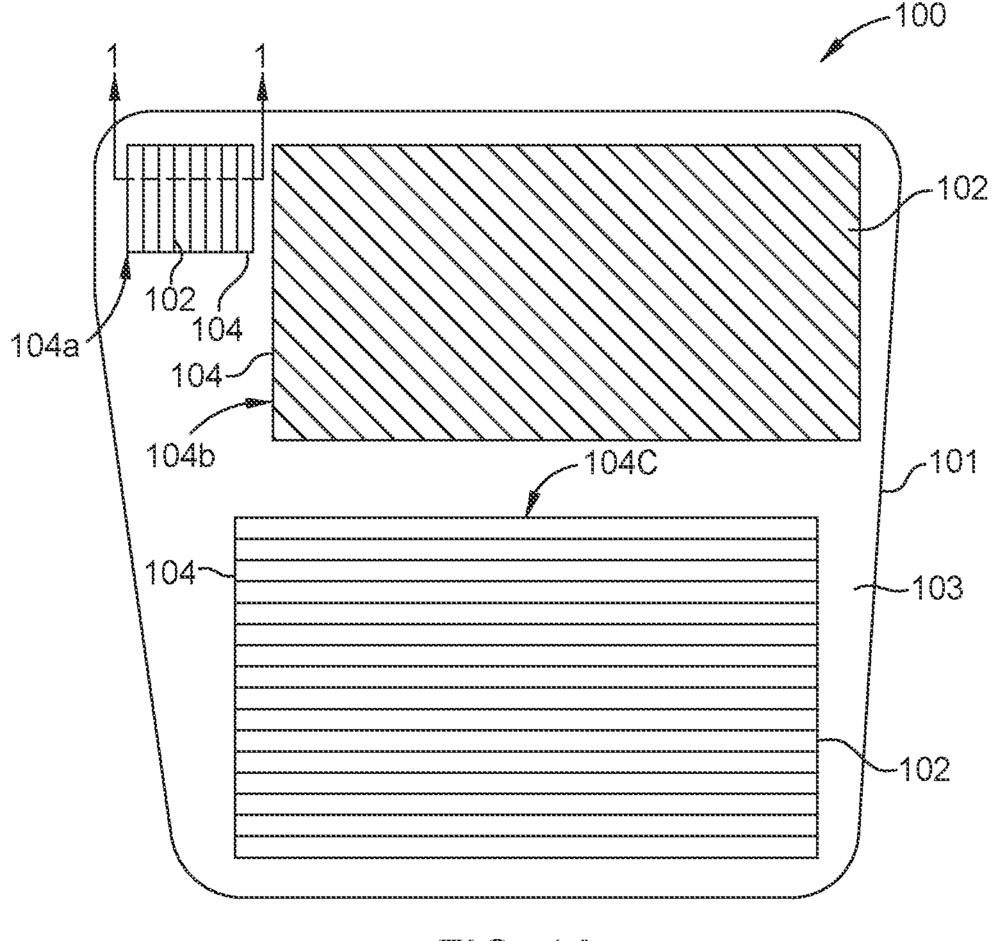
FIG. 1 is a schematic, top view of a waveguide combiner according to embodiments.

FIG. 1 is a schematic, top view of a waveguide combiner 100. The waveguide combiner 100 includes a plurality of optical device structures 102 disposed on a first surface 103 of a substrate 101 to form a grating 104. The optical device structures 102 may be nanostructures having sub-micron dimensions, e.g., nano-sized dimensions. The optical device structure 102 is configured in a way to create a plurality of trenches 213. The plurality of trenches 213 are defined by adjacent optical device structures 102 have a width less than one micron. The waveguide combiner 100 includes at an ICG 104*a* corresponding to an input coupling grating and an OCG 104*c* corresponding to an output coupling grating. The waveguide combiner according to the embodiment, which can be combined with other embodiments described herein, includes a PEG 104*b* corresponding to an intermediate grating. The cross-sections of the optical device structures 102 may have square or rectangular shaped cross-sections or can have other shapes including, but not limited to, circular, triangular, elliptical, regular polygonal, irregular polygonal, and/or irregular shaped cross-sections. In some embodiments, which can be combined with other embodiments described herein, the cross-sections of the optical device structures 102 on the waveguide combiner 100 are different.

The substrate 101 may be formed from any suitable material, provided that the substrate 101 can adequately transmit light in a selected wavelength or wavelength range and can serve as an adequate support for the waveguide combiner 100 described herein. In some embodiments, which can be combined with other embodiments described herein, the material of the substrate 101 has a refractive index that is relatively low, as compared to the refractive index of the plurality of optical device structures 102. Substrate selection may include substrates of any suitable material, including, but not limited to, amorphous dielectrics, non-amorphous dielectrics, crystalline dielectrics, silicon oxide, polymers, and combinations thereof. In some embodiments, which may be combined with other embodiments described herein, the substrate 101 includes a transparent material. In one example, the substrate 101 includes glass, silicon (Si), silicon dioxide ($SiO_2$), germanium (Ge), silicon germanium (Site), Indium phosphide (InP), Gallium arsenide (GaAs), Gallium nitride (GaN), fused silica ($SiO_2$), quartz ($SiO_2$), sapphire ($Al_2O_3$), silicon carbide (SiC), Lithium niobate ($LiNbO_3$), Indium Tin Oxide (ITO), high-index transparent materials such as high-refractive-index glass, or combinations thereon. One example of high refractive index glass includes greater than 2 percent by weight of Lanthanide (Ln), Titanium (Ti), Tantalum (Ta), or combination thereof. The index of the example high refractive index glass substrate is greater than 1.7 at 532 nm.

Figure 2A:
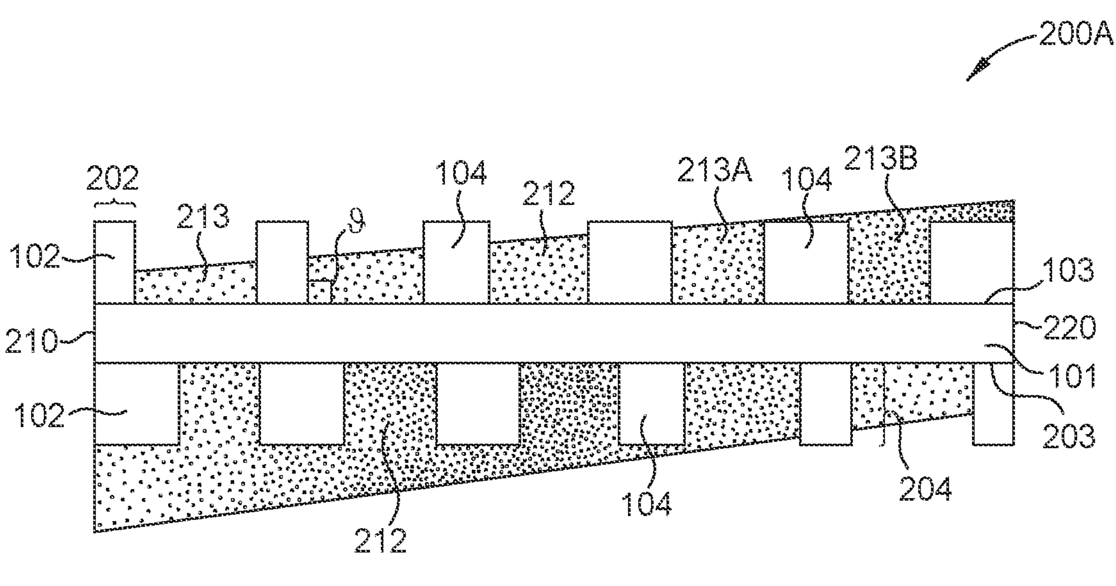
FIG. 2A is a schematic, cross-sectional view of a grating of a waveguide combiner according to embodiments.
Figure 2B:
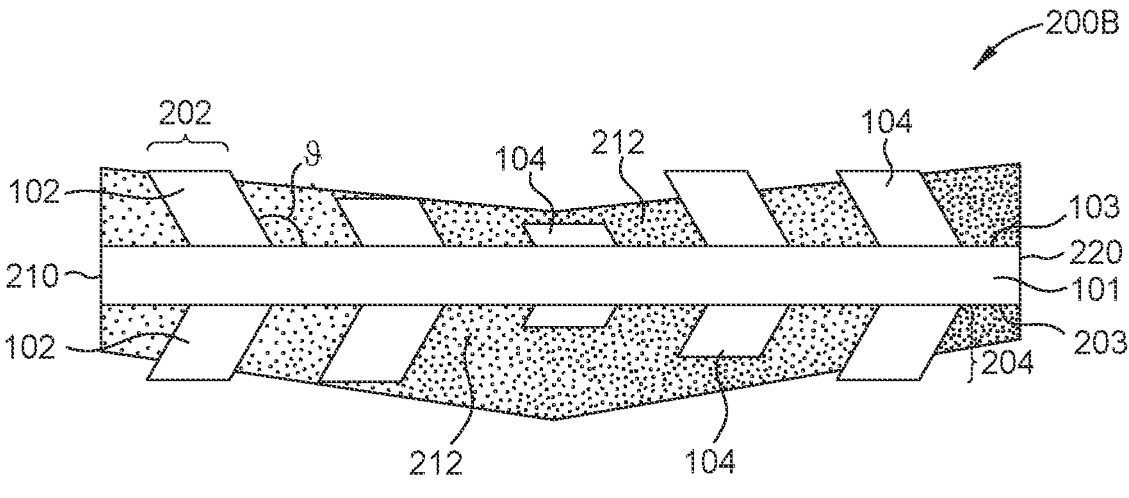

FIGS. 2A and 2B are schematic, cross-sectional views of a grating 200A, 200E of the waveguide combiner 100 taken along section line 1-1 of FIG. 1. In one embodiment, which can be combined with other embodiments described herein, the grating 200A, 200E corresponds to the ICG 104*a*, the PEG 104*b*, or the OCG 104*c* of the waveguide combiner 100 as shown in FIG. 1. The plurality of optical device structures 102 are disposed on the first surface 103 of the substrate 101. Each optical device structure 102 of the plurality of optical device structures 102 has an optical device structure width 202. In one embodiment, the optical device structures also connect to the substrate 101 on a second surface 203 of the substrate 101. In one embodiment, which can be combined with other embodiments described herein, at least one optical device structure width 202 may be different from another optical device structure width 202. In another embodiment, which can be combined with other embodiments described herein, each optical device structure width 202 of the plurality of optical device structures 102 is substantially equal to each other optical device structure width 202.

Each trench of the plurality of trenches 213 has a depth 204 measured from first surface 103 of the substrate 101 to the upper surface of the adjacent optical device structures 102. As shown in FIG. 2A the plurality of optical device structures 102 on the grating 200A are vertical, i.e., the device angle θ is 90 degrees. As shown in the grating 200E in FIG. 2B, the plurality of optical device structures 102 are angled relative to the first surface 103 of the substrate 101. In one embodiment, which can be combined with other embodiments described herein, each respective device angle θ for each optical device structure 102 is substantially equal. In another embodiment, which can be combined with other embodiments described herein, at least one respective device angle θ of the plurality of optical device structures 102 is different than another device angle θ of the plurality of optical device structures 102.

The trenches 213 include a gap-filler 212 disposed therein. An RI and a depth of the gap-filler 212 in at least two trenches in the plurality of trenches 213 are different. For example, the RI and depth of the gap-filler 212 vary across the length of the trenches 213. The varied RI and depths of the gap-filler 212 optimize the efficiency or color uniformity in the grating 200A, 200E of the waveguide combiner 100. In at least two trenches of a plurality of trenches 213, a first trench 213A and a second trench 213B, the gap-filler 212 includes a first gap-fill material and a second gap-fill material. A volume of at least one of the first gap-fill material and the second gap-fill material in the first trench 213A is different from the volume of at least one of the first gap-fill material and the second gap-fill material in the second trench 213B. This allows for the RI to be different across the trenches 213. A total volume of material is the total of the volume of the first gap-fill material and the second gap-fill material inside a respective trench in the plurality of trenches 213, The greater the total volume the more of the trench 213 will be filled by the gap-filler 212. The total volume of the first gap-fill material and the second gap-fill material in the first trench 213A is different from the total volume of the first gap-fill material and the second gap-fill material in the second trench 213B. This allows the depth of the gap-filler 212 to be different across the trenches 213. The first gap-fill material and the second gap-fill material merge to form the gap-filler 212, The first gap-fill material is a high refractive material, i.e., the first gap-fill material has a refractive index greater than or equal to 1.6, such as about 1.6 to about 2.2 at 532 nanometers. In other embodiments, the first gap-fill material has a refractive index greater than or equal to 1.7 at 532 nanometers. The second gap-fill material is a low refractive material, i.e., the second gap-fill material has a refractive index of less than or equal to 1.6, such as about 1.0 to about 1.6 at 532 nanometers. In other embodiments, the second gap-fill material has a refractive index less than or equal to 1.7 at 532 nanometers. The refractive index of the first gap-fill material is greater than the refractive index of the second gap-fill material. The volumes of the first gap-fill material and the second gap-fill material are selected to control a refractive index of the gap-filler 212 each of the trenches 213. The refractive index of the gap-filler 212 is about 1.5 to about 2.0.

The first gap-fill material includes, but is not limited to, $SiO_2$, $TiO_2$, $ZrO_2$, $Nb_2O_5$, $HfO_2$, $V_2O_5$, $PbO_2$, $Ta_2O_5$, ZnO, $SnO_2$, $Al_2O_3$, AgO, $Ag_2O$, $Li_2O$, diamond such as nanodiamond, or combinations thereof. The stoichiometry of metal and oxide might deviate from the ratio list. The first gap-fill material may include nanoparticles, sol-gel, binders, additives, solvents, or combination thereof. The nanoparticles may further include ligands, such as, a fatty acid, amines, alcohols, silanes, a polyester, a polyether, a poly(meth) acrylate, a polyvinyl alcohol), a polyvinyl pyrrolidone), salts, or combinations thereof. The sol-gel material may include Ti cations, Zr cations, Nb cations, Zn cations, Hf cations, Ta cations, or combination thereof. The sol-gel material may include a photo-initiator or photoacid generator. The binders include an epoxy, a (meth)acrylate, a thiol, a vinyl ether, an alkene, an alkyne, a photo-initiator, a polymer, or combinations thereof. The additives include surfactants or rheology modifiers.

The second gap-fill material includes, but is not limited to, fluorinated acrylate, fluorinated epoxy, fluorinated alkene, fluorinated polymers, hollow structured nanoparticles, and mesoporous materials, aerogel, or combinations thereof. The second gap-fill material may include binders, additives, and solvents or combination thereof. The binders include an epoxy, a (meth)acrylate, a thiol, a vinyl ether, an alkene, an alkyne, a photo-initiator, a polymer, or combinations thereof. The additives include surfactants or rheology modifiers.

One embodiment is shown in FIG. 2A, the RI and the total volume in the trenches 213 increase linearly from a left side 210 to a right side 220 on the first surface 103. On the second surface 203, the RI and the total volume decrease linearly from the left side 210 to the right side 220. In one example, as shown in FIG. 2A, the duty cycle may change across the grating 104. As shown in FIG. 2B, for the first surface 103 of the substrate 101 the RI and the total volume vary from the left side 210 to the right side 220. In one example, the height of at least two optical device structures are different. In other embodiments, the depth and the RI varies in different ways across the trenches 213. The RI and total volume is controlled by an inkjet process such that the grating 104 can be designed in a way to control the efficiency and color uniformity of light passing through it.

Figure 3:
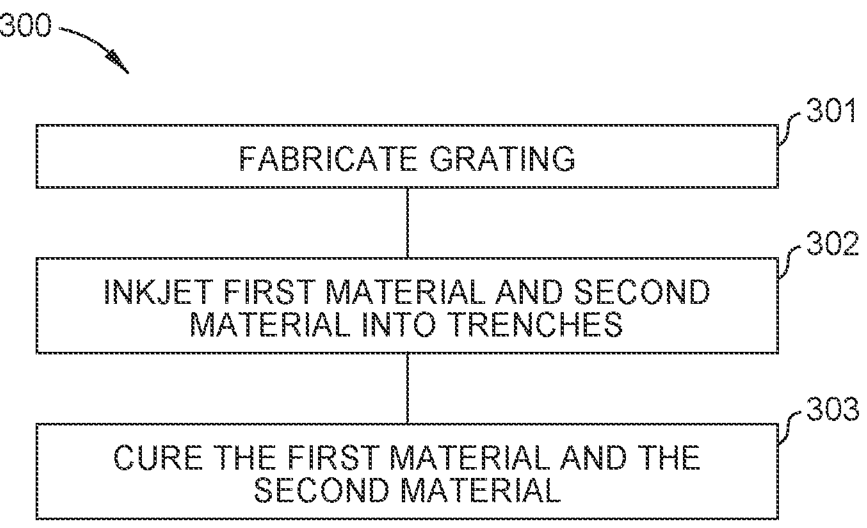
FIG. 3 is a flow diagram of a method for forming a waveguide combiner according to embodiments.
Figure 4A:
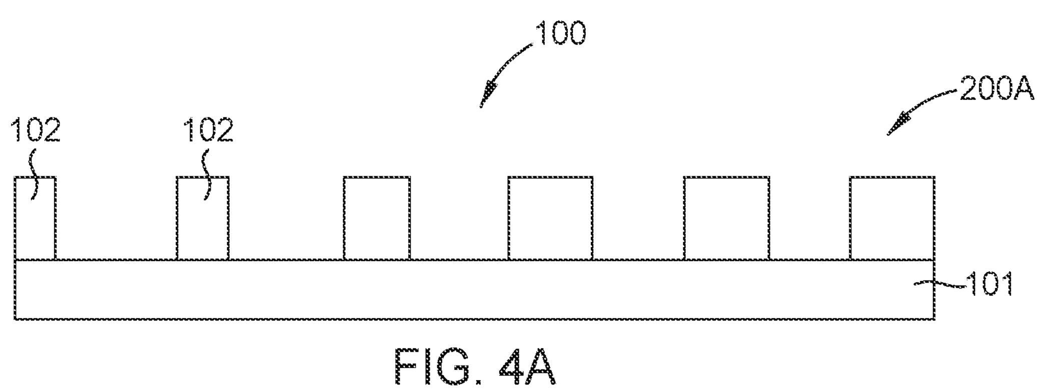
FIG. 4A-4C are schematic, cross-sectional views of a substrate during a method of forming a waveguide combiner according to the embodiments.
Figure 4B:
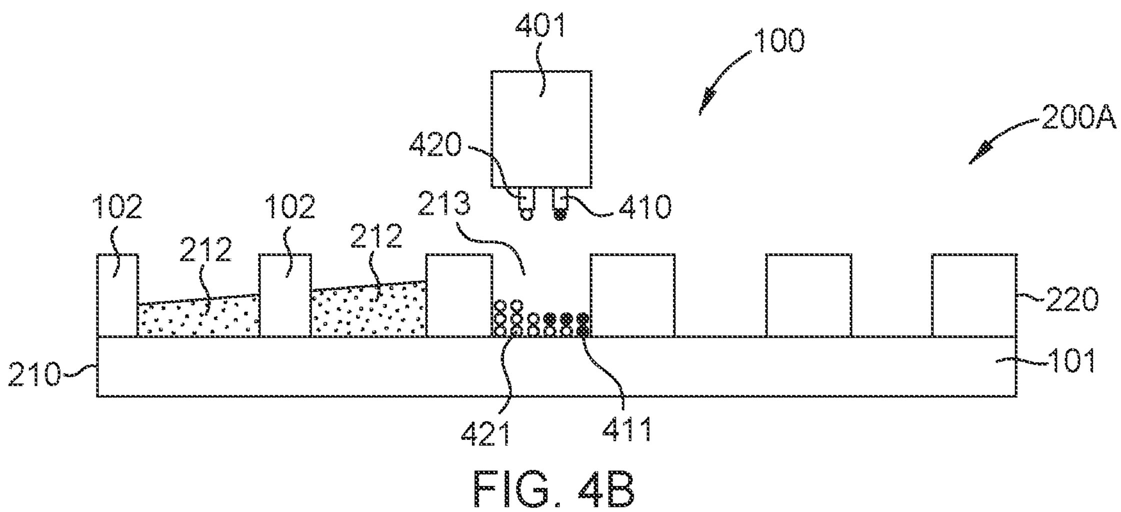
Figure 4C:
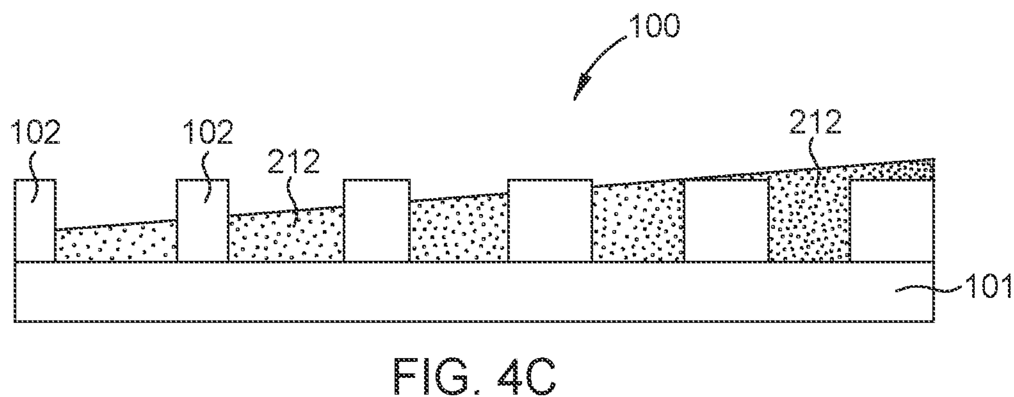

FIG. 3 is a flow diagram of a method 300 for forming a waveguide combiner 100 according to embodiments, as shown in FIGS. 4A-4C. FIGS. 4A-4C are schematic, cross-sectional views of the substrate 101 during the method 300. FIGS. 4A-4C depict the first surface 103 of the substrate 101. The method 300 may be repeated for the bottom surface. At operation 301, as shown in FIG. 4A, the grating 200A is fabricated. The grating 200A includes optical device structures 102. In other embodiments, the grating 200B is formed. The structures may be formed by a nano-imprint lithography process or a direct etch process.

At operation 302, as shown in FIG. 4B, a first gap-fill material 411 and a second gap-fill material 421 are inkjet onto the substrate 101 into the trenches 213 forming the gap-filler 212. The gap-filler 212 in each trench in the plurality of trenches 213 has an RI and a total volume. A volume of at least one of the first gap-fill material 411 and the second gap-fill material 421 in the first trench 213A is different from the volume of at least one of the first gap-fill material and the second gap-fill material in the second trench 2133. A total volume of material is the total of the volume of the first gap-fill material 411 and the second gap-fill material 421 inside a respective trench in the plurality of trenches 213. The greater the total volume the more of the trench 213 will be filled by the gap-filler 212. The total volume of the first gap-fill material 411 and the second gap-fill material 421 in the first trench 213A is different from the total volume of the first gap-fill material 411 and the second gap-fill material 421 in the second trench 213B. The first gap-fill material 411 is a high refractive material that has a refractive index greater than or equal to 1.6. The second gap-fill material 421 is a low refractive material that has a refractive index of less than or equal to 1.6. The refractive index of the first gap-fill material 411 is always greater than the refractive index of the second gap-fill material 421, The RI and the total volume are different in at least two trenches in the plurality of trenches 213. An inkjet device 401 with a first inkjet head 410 and a second inkjet head 420 performs the inkjet process. The first inkjet head 410 distributes the first gap-fill material 411. The second inkjet head 420 distributes a second gap-fill material 421. The first gap-fill material 411 and the second gap-fill material 421 merge to form the gap-filler 212.

At operation 303, the first gap-fill material 411 and the second gap-fill material 421 are cured. The curing process includes exposing the waveguide combiner 100 to electromagnetic radiation, such as infrared (IR) radiation or ultraviolet (UV) radiation.

In summation, waveguides and a method of fabricating a waveguide combiner having at least one grating with trenches gap-filled with variable refractive index materials are described herein. At least two trenches of at least one grating includes a first gap-fill material having a first volume and a first refractive index, and a second dap-fill material having a second volume and a second refractive index different than the first refractive index. The trenches have a volume of at least one of the first gap-fill material and the second gap-fill material and a total volume of both the first gap-fill material and the second gap-fill material that are different such that the at least two trenches have different refractive indices and different gap-fill depths. Control of the deposition of first volume and the deposition of second volume in an inkjet deposition process provide for the formation of the grating with two trenches that have different refractive indices and different gap-fill depths. The first gap-fill material and the second gap-fill material merge to form the gap-filler. Therefore, by controlling the varied refractive indices and different gap-fill depths the waveguide combiner is optimized by efficiency or a color uniformity.

While the foregoing is directed to embodiments of the present disclosure, other and further embodiments of the disclosure may be devised without departing from the basic scope thereof, and the scope thereof is determined by the claims that follow,

What is claimed is:

1. A waveguide combiner, comprising:
- a grating disposed on a substrate, the grating having a plurality of optical device structures defining a plurality of trenches, each trench is defined by adjacent optical device structures;
- a first gap-fill material having a first refractive index; and
- a second gap-fill material having a second refractive index less than the first refractive index, wherein:
  - a first trench with the first gap-fill material and the second gap-fill material disposed therein; and
  - a second trench with the first gap-fill material and the second gap-fill material disposed therein, wherein:
    - a volume of at least one of the first gap-fill material and the second gap-fill material in the first trench is different from the volume of at least one of the first gap-fill material and the second gap-fill material in the second trench;
    - a total volume of the first gap-fill material and the second gap-fill material in the first trench is different from the total volume of the first gap-fill material and the second gap-fill material in the second trench; and
    - a first top surface of the first gap-fill material and the second gap-fill material in the first trench is on a different plane from a second top surface of the first gap-fill material and the second gap-fill material in the second trench.

2. The waveguide combiner of claim 1, wherein the first gap-fill material is made of $SiO_2$, $TiO_2$, $ZrO_2$, $Nb_2O_5$, $HfO_2$, $V_2O_5$, $PbO_2$, $Ta_2O_5$, ZnO, $SnO_2$, $Al_2O_3$, AgO, $Ag_2O$, $Li_2O$, diamond, or combinations thereof.

3. The waveguide combiner of claim 1, wherein the second gap-fill material is made of fluorinated acrylate, fluorinated epoxy, fluorinated alkene, fluorinated polymers, hollow structured nanoparticles, mesoporous materials, aerogel, or combinations thereof.

4. The waveguide combiner of claim 1, wherein the plurality of optical device structures are at an angle relative to the substrate.

5. The waveguide combiner of claim 1, wherein a duty cycle changes across the grating.

6. The waveguide combiner of claim 1, wherein at least two optical device structures have a height different from each other.

7. The waveguide combiner of claim 1, wherein a height of the first top surface from the substrate is different from a height of the second top surface from the substrate.

8. A waveguide combiner comprising:
- a first grating disposed on a first surface of a substrate, the first grating having a plurality of optical device structures defining a plurality of trenches, each trench is defined by adjacent optical device structures wherein a height of the optical device structures varies along with a depth of the plurality of trenches;
- a first gap-fill material having a first refractive index; and
- a second gap-fill material having a second refractive index less than the first refractive index, wherein:
  - a first trench with the first gap-fill material and the second gap-fill material disposed therein; and
  - a second trench with the first gap-fill material and the second gap-fill material disposed therein, wherein:
    - a volume of at least one of the first gap-fill material and the second gap-fill material in the first trench is different from the volume of at least one of the first gap-fill material and the second gap-fill material in the second trench;
    - a total volume of the first gap-fill material and the second gap-fill material in the first trench is different from the total volume of the first gap-fill material and the second gap-fill material in the second trench; and
    - a first top surface of the first gap-fill material and the second gap-fill material in the first trench is on a different plane from a second top surface of the first gap-fill material and the second gap-fill material in the second trench.

9. The waveguide combiner of claim 8, wherein the plurality of optical device structures are at an angle relative to the substrate.

10. The waveguide combiner of claim 8, wherein a duty cycle changes across the first grating.

11. The waveguide combiner of claim 8, wherein a second grating is disposed on a second surface of the substrate, the second grating having the plurality of optical device structures defining the plurality of trenches and the trenches having the first gap-fill material and the second gap-fill material.

12. The waveguide combiner of claim 8, wherein the first gap-fill material is made of $SiO_2$, $TiO_2$, $ZrO_2$, $Nb_2O_5$, $HfO_2$, $V_2O_5$, $PbO_2$, $Ta_2O_5$, ZnO, $SnO_2$, $Al_2O_3$, AgO, $Ag_2O$, $Li_2O$, diamond, or combinations thereof.

13. The waveguide combiner of claim 8, wherein the second gap-fill material is made of fluorinated acrylate, fluorinated epoxy, fluorinated alkene, fluorinated polymers, hollow structured nanoparticles, mesoporous materials, aerogel, or combinations thereof.

14. A method of forming a waveguide combiner comprising:
- forming a grating on a substrate having a plurality of optical device structures defining a plurality of trenches, each trench is defined by adjacent optical device structures;
- inkjeting a first gap-fill material having a first refractive index and a second gap-fill material having a second refractive index less than the first refractive index over the grating in the trenches, wherein:

a first trench with the first gap-fill material and the second gap-fill material disposed therein; and a second trench with the first gap-fill material and the second gap-fill material disposed therein, wherein;

a volume of at least one of the first gap-fill material and the second gap-fill material in the first trench is different from the volume of at least one of the first gap-fill material and the second gap-fill material in the second trench;

a total volume of the first gap-fill material and the second gap-fill material in the first trench is different from the total volume of the first gap-fill material and the second gap-fill material in the second trench; and a first top surface of the first gap-fill material and the second gap-fill material in the first trench is on a different plane from a second top surface of the first gap-fill material and the second gap-fill material in the second trench; and curing the first gap-fill material and the second gap-fill material during a curing process.

15. The method of claim 14, wherein the plurality of optical device structures are at an angle relative to the substrate.

16. The method of claim 14, wherein the first gap-fill material is made of $SiO_2$, $TiO_2$, $ZrO_2$, $Nb_2O_5$, $HfO_2$, $V_2O_5$, $PbO_2$, $Ta_2O_5$, ZnO, $SnO_2$, $Al_2O_3$, AgO, $Ag_2O$, $Li_2O$, diamond, or combinations thereof.

17. The method of claim 14, wherein the second gap-fill material is made of fluorinated acrylate, fluorinated epoxy, fluorinated alkene, fluorinated polymers, hollow structured nanoparticles, mesoporous materials, aerogel, or combinations thereof.

18. The method of claim 14, wherein the curing process includes exposing the first gap-fill material and the second gap-fill material to electromagnetic radiation, infrared radiation or ultraviolet radiation.

19. The method of claim 14, wherein a duty cycle changes across the grating.

20. The method of claim 14, wherein at least two optical device structures have a height different from each other.

21. The method of claim 14, wherein the inkjeting is performed by an inkjet device having a first inkjet head and a second inkjet head, the first inkjet head inkjeting the first gap-fill material and the second inkjet head inkjeting the second gap-fill material.

22. The method of claim 14, wherein a height of the first top surface from the substrate is different from a height of the second top surface from the substrate.

* * * * *